US012496694B2

(12) United States Patent
Cook et al.

(10) Patent No.: US 12,496,694 B2
(45) Date of Patent: Dec. 16, 2025

(54) TITANIUM HAMMER

(71) Applicant: AMAX INCORPORATED, North Kingstown, RI (US)

(72) Inventors: Vincent Cook, Milford, CT (US); Dennis Danville, Chepachet, RI (US)

(73) Assignee: AMAX INCORPORATED, North Kingstown, RI (US)

( * ) Notice: Subject to any disclaimer, the term of this patent is extended or adjusted under 35 U.S.C. 154(b) by 383 days.

(21) Appl. No.: 18/196,391

(22) Filed: May 11, 2023

(65) Prior Publication Data

US 2023/0364767 A1 Nov. 16, 2023

Related U.S. Application Data

(60) Provisional application No. 63/341,853, filed on May 13, 2022.

(51) Int. Cl.
*B25D 1/00* (2006.01)
*B25G 1/10* (2006.01)

(52) U.S. Cl.
CPC ................. *B25D 1/00* (2013.01); *B25G 1/10* (2013.01); *B25D 2222/45* (2013.01)

(58) Field of Classification Search
CPC . B25D 1/00; B25D 1/02; B25D 1/045; B25D 1/08; B25D 1/10; B25D 1/12; B25D 1/14; B25D 1/16; B25D 17/005; B25D 17/06; B25D 2222/45; B25G 1/00; B25G 1/01; B25G 1/02; B25G 1/10; B25G 1/102; B25G 3/26; B25G 3/28; B25G 3/36; B25F 1/006; B25F 1/02; B25F 5/02
See application file for complete search history.

(56) References Cited

U.S. PATENT DOCUMENTS

| | | | | | |
|---|---|---|---|---|---|
| 2,601,294 | A * | 6/1952 | Jahn | B25D 1/02 81/19 |
| 3,343,576 | A * | 9/1967 | Norcross | B25D 1/12 81/19 |
| 5,255,575 | A * | 10/1993 | Williams | B25F 1/02 81/26 |
| D425,772 | S | 5/2000 | Pringle et al. | |
| 6,347,562 | B1 * | 2/2002 | Gerber, Jr. | B25D 1/02 81/25 |
| 6,536,308 | B1 | 3/2003 | Thorne et al. | |
| 6,923,432 | B1 | 8/2005 | Martinez | |

(Continued)

FOREIGN PATENT DOCUMENTS

GB 2190322 * 11/1987

*Primary Examiner* — Robert J Scruggs
(74) *Attorney, Agent, or Firm* — Paul Y. Feng; ONE LLP

(57) ABSTRACT

A handheld titanium hammer including a handle with a transverse hoop at one end, and a hammer head inserted therein. The hoop at the front-facing edge includes a notch. The hammer head includes a flange with a nub and an intermediate portion with a downward facing sloped surface and a recessed bed. A wedge having an upward facing angular surface fits into the hoop from the back end and pushes against the sloped surface of the intermediate portion for a wedging action. The wedging action also lifts the bed into a flattened wall section of the hoop capturing it therein. The nub of the flange is captured within the notch in the hoop. A fastened secures the wedge and hammer head together inside the hoop.

18 Claims, 2 Drawing Sheets

(56) References Cited

U.S. PATENT DOCUMENTS

| | | | | |
|---|---|---|---|---|
| 8,534,643 | B2 | 9/2013 | Lombardi et al. | |
| 9,168,648 | B2 | 10/2015 | Lombardi | |
| 9,718,179 | B1 | 8/2017 | Martinez | |
| 9,802,304 | B2 | 10/2017 | West et al. | |
| 2015/0251302 | A1 * | 9/2015 | Flosi | B25D 7/00 81/25 |
| 2019/0255691 | A1 | 8/2019 | Paulsen et al. | |

* cited by examiner

TITANIUM HAMMER

CROSS-REFERENCE TO RELATED APPLICATIONS

This non-provisional patent application claims benefit of priority from U.S. provisional application No. 63/341,853, filed on May 13, 2022, the contents of which are hereby incorporated by reference.

FIELD OF THE INVENTION

The present invention is directed to hammers commonly used in the construction industry. More precisely, the present invention is directed to a two-piece titanium hammer.

BACKGROUND

Hammers are typically manufactured using two different methods of construction: a two-piece design where the metal head and non-metal handle are made separately then assembled together, versus a one-piece design where the head and handle are formed from one piece of metal.

A two-piece hammer consists of a metallic head with a through-hole or eyelet to receive either a wood or composite handle. In a wood handled hammer the handle is inserted through the hole in the head and secured using mechanical fasteners. In a composite-handled hammer the handle is typically constructed from a durable, pultruded fiberglass core that is over-molded with durable plastic and rubber. The rubber is used in the grip area for comfort, dampening vibration, and a secure grip with the remainder of the fiberglass core being covered in plastic. The non-gripping end of the handle is stepped down allowing it to be press fit into the lower portion of the through hole in the head while a smaller section protrudes into but not through the hole with a void space around it. The void space is filled with a chemically activated epoxy resin that secures the hammer head to the handle when cured. The aforementioned press fit between the handle and the lower portion of the through hole acts as a gasket to prevent the epoxy from leaking out the bottom of the hole during assembly before it cures.

In a one-piece design the hammer handle and head are made from the same material and are formed at the same time during the manufacturing process. Since they are made from the same piece, there is no mechanical interface needed between the handle and head. To make the hammer more comfortable to use, a grip is installed over the lower portion of the metallic handle.

In the last several years a few manufacturers have released hybrid style designs which deviate from the most common manufacturing methods mentioned above. Most notably U.S. Pat. No. 9,718,179 (Martinez) utilizes a two-piece design where the head and handle are both metallic and bolted together with a fastener.

In U.S. Pat. No. 9,168,648 (Lombardi), this two-piece hammer consists of a handle with a steel core (versus fiberglass) surrounded by plastic in an effort to reduce the overall weight and allow for slight compliance between the handle and the hammer head to reduce vibration felt by the user after impact. In this design, the handle is permanently affixed to the head.

SUMMARY OF THE INVENTION

The present invention in a preferred embodiment is directed to a handheld hammering tool. The tool, such as a household, carpenter, or camping hammer, includes a hammer head having a preferably hardened impact face at one end, wherein the hammer head further includes a flange having a nub at its periphery, an intermediate portion including a stepped-down, recessed bed and an angled profile, and a claw at an opposite end. The tool further includes a handle optionally made from a material including titanium or the like, wherein the handle includes an elongated shaft with a grip at one end and a cylindrical hoop at an opposite end that is disposed at a right angle to the elongated shaft, and wherein the hoop includes a front-facing edge with a notch for receiving the nub therein, and wherein the hoop further includes a flattened wall section. The hammer head is preferably inserted front the front of the hoop during assembly at the factory.

The tool also includes a locking means for securing the hammer head to the handle, wherein the locking means includes a wedge with an angular surface abutting the angled profile of the intermediate portion inside the hoop. The wedge, when inserted from the back end of the hoop, pushes the recessed bed of the hammer head into and capturing the flattened wall section of the hoop therein. The hammer further includes a fastener holding the wedge and the intermediate portion together.

The wedging action pushes the recessed bed section into the flattened wall section capturing or trapping it therein. This prevents any axial movement of the hammer head relative to the hoop/handle even after many repeated hammer head strikes as the tool is used. To prevent rotational movement of the hammer head relative to the hoop/handle, the nub of the flange engages notch at the front-facing edge of the hoop, which captures or locks the nub therein.

In various alternative embodiments, the handle may be fashioned from steel, titanium, aluminum, fiberglass, wood, plastic, iron, or any combination thereof. The hammer head may be fashioned from hardened steel, titanium, aluminum, iron, lead, metal cladding, or any combination thereof.

DETAILED DESCRIPTION OF THE PREFERRED EMBODIMENTS

The present invention in various preferred embodiments contemplates a titanium hammer assembled from multiple components. What is loosely referred to as "two-piece" hammers are of interest, because the two key components such as the hammer head and the handle shaft can be made from different materials. For instance, the handle shaft may be constructed from lightweight titanium or like alloy, while the head is made from hardened steel or like strong material. If the head is also made from titanium, there may be wear or durability concerns because titanium is a softer material as compared to steel. Of course, a titanium hammer head may be clad with a tougher material to protect the softer titanium.

Making a hammer from, say, two pieces allows the handle shaft to be made from a less expensive material such as wood, plastic, or fiberglass. Fabricating the complex shape of a hammer using a single piece of base material for the hammer head and shaft may increase the cost of fabrication for molds and finish machining. Fabricating a head from the shaft in discrete pieces reduces the manufacturing costs.

An important consideration is safety for the user in having the hammer head and shaft staying tightly assembled while undergoing many, many impact blows when used for many years. Because of the many impact blows to the head transmit shock and vibration to the locking mechanism, the hammer design and locking mechanism are important considerations for safety of the user and those working around the user. The locking mechanism should not fracture or become loosened throughout the life of the hammer. And even in the unlikely event of the locking mechanism's failure, the head and shaft should stay together sufficiently so that the user can recognize such failure has occurred and immediately stop using the hammer.

Disclosed below are two preferred embodiments of a two-piece hammer. Although loosely described as two pieces referring to the hammer head and shaft, it is contemplated that the present invention hammer may be fashioned from more than two pieces, such as adding a rubber grip covering the handle, cladding to the hammer head, multiple component pieces assembled together for the shaft or hammer head, etc. The preferred embodiment hammer has a titanium shaft, but other materials and combination of materials are contemplated.

Figure 2:
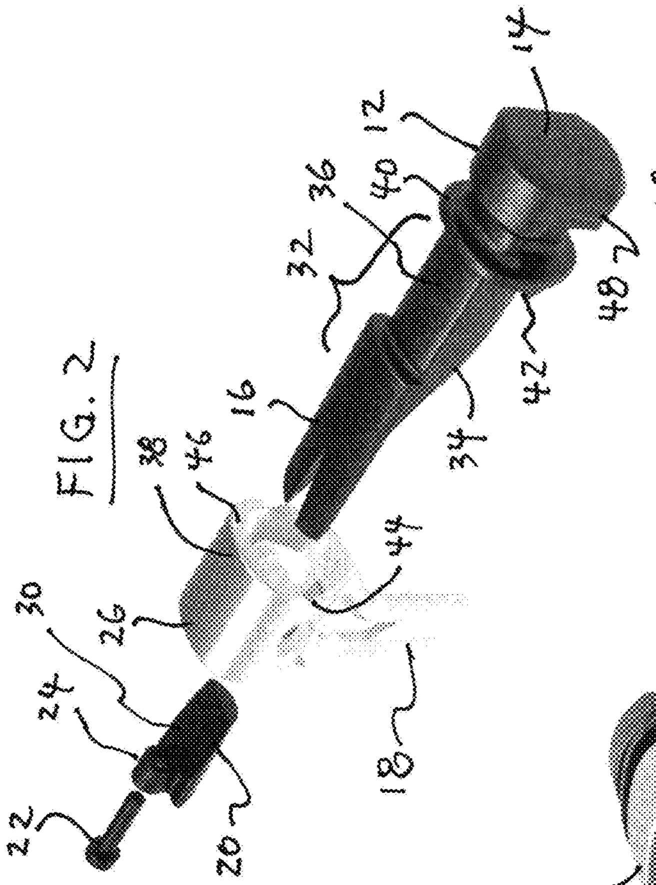
FIG. 2 is an exploded view of the hammer from FIG. 1 showing the hammer head assembly and the cylindrical hoop end of the handle.
Figure 5:
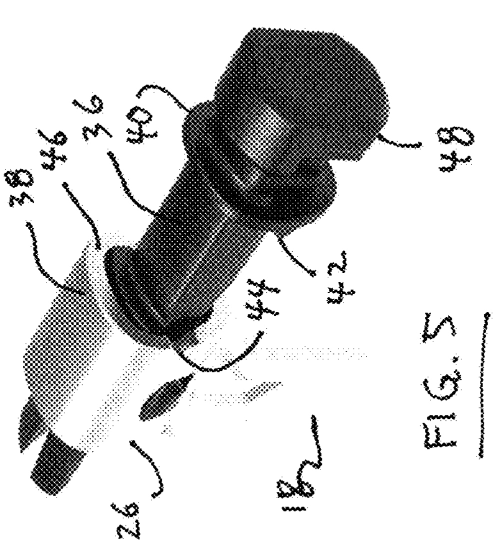
FIG. 5 is a front perspective view of the hammer head disassembled from the hoop.
Figure 4:
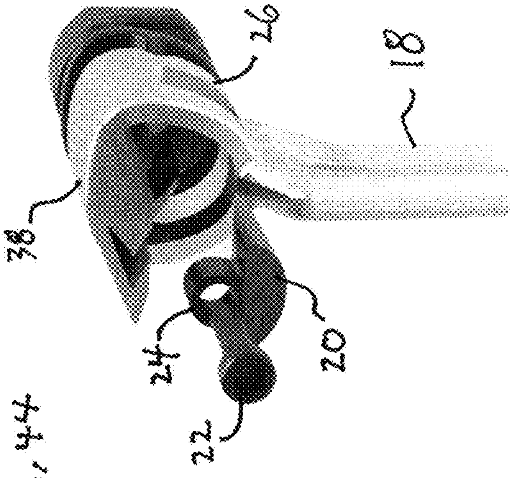
FIG. 4 is a rear view of the fastener and wedge.
Figure 1:
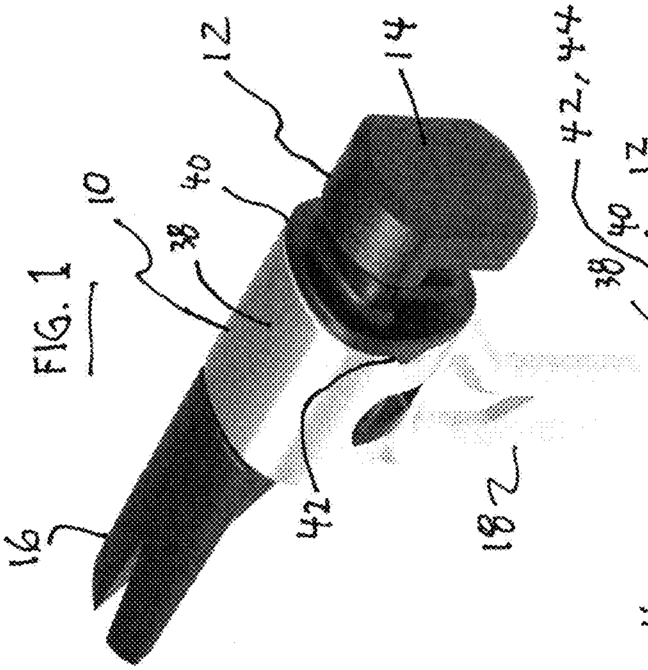
FIG. 1 depicts a preferred embodiment hammer.
Figure 3:
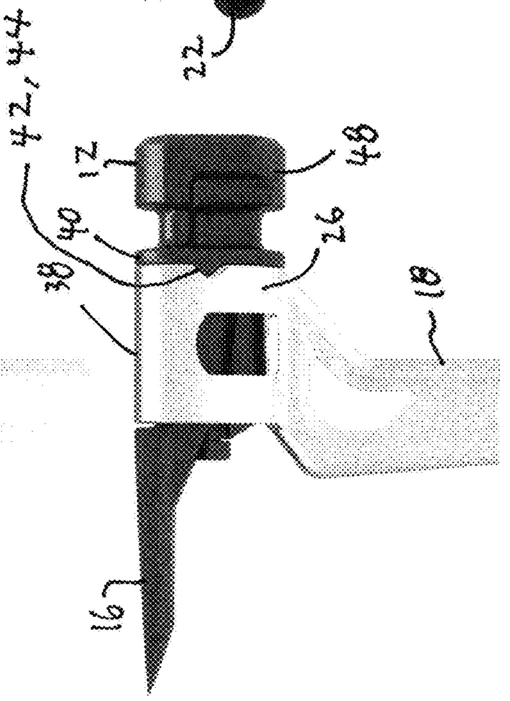
FIG. 3 is a side elevational view of the hammer from FIG. 1.
Figure 7:
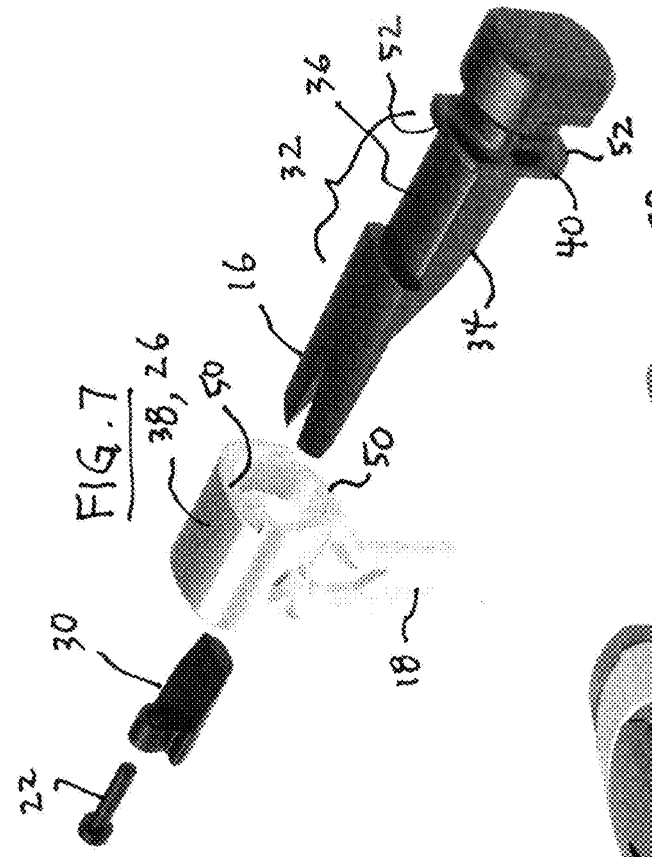
FIG. 7 is an exploded view of the hammer from FIG. 6 showing the hammer head assembly and the cylindrical hoop end of the handle.
Figure 10:
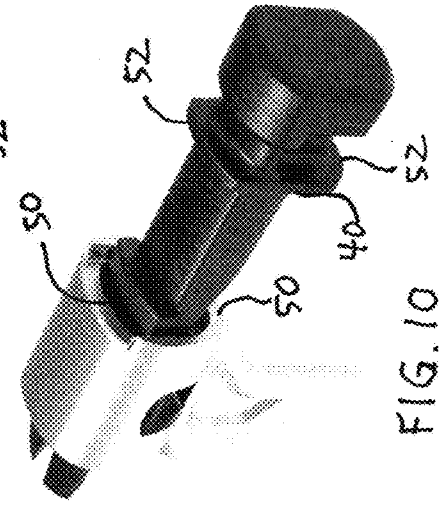
FIG. 10 is a front perspective view of the hammer head disassembled from the hoop.
Figure 9:
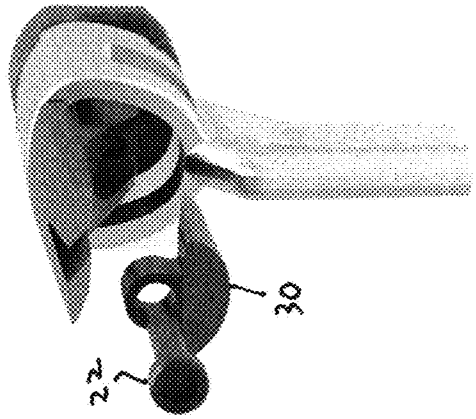
FIG. 9 is a rear view of the fastener and wedge.
Figure 6:
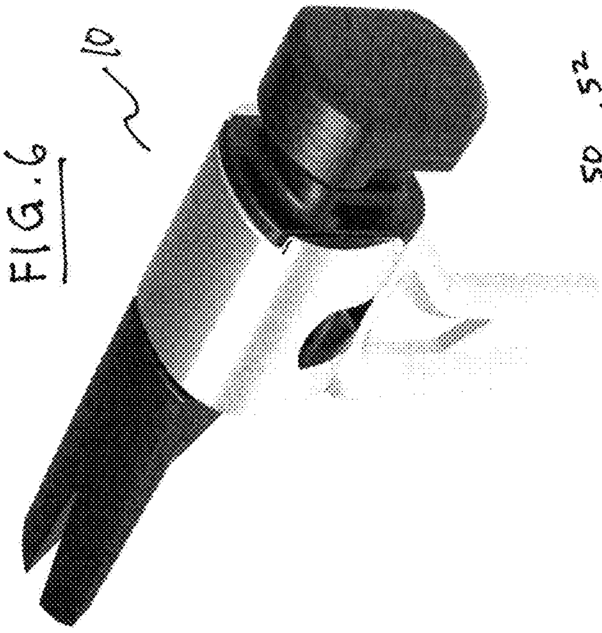
FIG. 6 is a perspective view of an alternative embodiment hammer.
Figure 8:
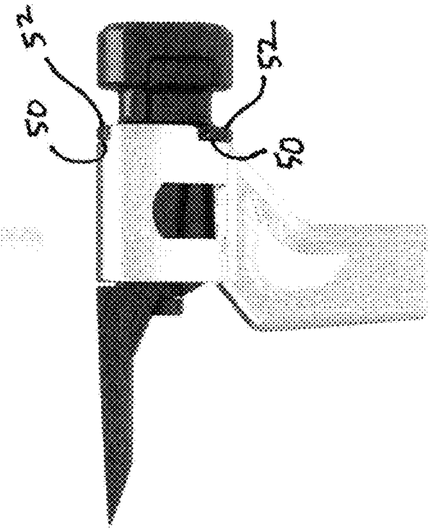
FIG. 8 is a side elevational view of the hammer from FIG. 6.

The first preferred embodiment is shown in FIGS. 1-5. The hammer 10 includes a handle with an elongated shaft 18 with a hoop 26 extending at a right angle or transverse relative to the shaft. The hoop and shaft are preferably forged or fashioned from an integral piece of material for strength. As best seen in FIG. 2, a hammer head 12 has a weighted section 48 with an impact face 14 at the front end and a claw 14 at the back end. As seen in FIG. 5, the hammer head 12 is inserted through the front end of the hoop 26 during assembly at the factory.

As seen in FIGS. 2-5, the hammer head 12 is assembled to the handle shaft 18 and held together by a locking means. That locking means in a preferred embodiment includes a wedge 20 assembled to the hammer head 12 via a fastener 22 such as threaded bolt inserted through a collar formed on the wedge 20 from the claw end 16. The wedge 20 is inserted into the hoop 26 from the back end.

As best seen in FIG. 2, wedge 20 has an angular surface 30 facing upward. The hammer head 12 has an intermediate portion 32 between the impact face 14 and the claw 16 that has an angled profile 34 defining a sloped flat surface facing downward. The wedge 20 when inserted into the hoop 26 during assembly at the factory abuts its angular surface 30 against the surface of the angled profile 34 where both have complementary slopes. As the fastener 22 is threaded forward, the action advances the wedge 20 farther and farther against the intermediate portion 32 of the hammer head 12 along the interface of the two sloped surfaces. This is the wedging action. This wedging action tightly and reliably secures the intermediate portion 32 of the hammer head to the inside diameter of the hoop 26, thus holding the hammer head 12 to the shaft 18.

Other locking means are contemplated, such as rivets, mechanical interlocking pieces, cement or bonding agents, a hook and eyelet, brazing, welding, latch locks, rack and pinion gears, multiple wedges, interference friction fits, and the like.

Optionally, the intermediate portion 32 includes a recessed bed 36 with a stepped-down profile as best seen in FIG. 5. During the wedging action, the recessed bed 36 is pushed upward and captures or traps a wall section 38 at the top of the hoop 26 therein. As seen in FIG. 2, the wall section 38 may preferably be flattened relative to the generally arcuate, cylindrical shape of the hoop 26. This flattened wall section 38 has a shape, length, and thickness designed for reliable and precise fitment within the dimensions of the recessed bed 36. As such, any axial travel of the hammer head backward (during impact hammer blows) or forward (during use of the claw) is completely restrained. Even during heavy hammer use with repeated impact blows, there is essentially no slop or play between the hammer head and the hoop/handle. This eliminates axial travel of the hammer head relative to the hoop/handle.

Moreover, the intermediate portion 32 and wedge 20 are preferably contained within the hoop 26. As the hammer 10 is swung swiftly in an arc during use, the centrifugal/inertial force from the accelerated mass of the hammer head 12 and wedge 20 assembly urges the assembly to separate from the shaft 18, if not constrained inside the hoop 26. Therefore, the hoop 26 holds the hammer head components together and inside, even if the parts become loose or fail. When swung by the user even after failure, the pieces will not be sent flying, because the hoop holds those pieces therein, at least momentarily. After the swing, the user will immediately recognize from sight, sound, or feel of the loosened or broken parts that the hammer has failed and will stop using it. Therefore, when the discrete components are contained inside the hoop 26, this feature provides another safety measure enjoyed by the preferred embodiment.

At the front end the recessed bed 36 just behind the impact surface 14 of the hammer head is an optional flange 40. As best seen in FIGS. 2, 5, the flange 40 includes preferably one or more spaced-apart, tooth-like nubs 42 that are essentially extended contours from the flange's outer periphery. One or more complementary, receiving notches 44 are present in the front-facing edge 46 of the hoop 26. When the hammer head 12 and hoop 26 are assembled (FIG. 3), the nubs 42 are trapped or captured within the respective notches 44. This prevents any unwanted axial rotation of the hammer head 12 relative to the hoop/handle during hammer use. The rotational forces arise typically when the claw 16 is used to twist and yank out a bent nail, for example. The shape of the tooth or nub is preferably triangular, but other shapes such as a square, semicircle, etc. are contemplated. The individual nubs and notches can have sizes and shapes different from each other, and can be located anywhere along the interface between the front-facing edge of the hoop and the flange periphery.

In the preferred embodiment, the flange 40 is spaced apart from the weighted section 48 of the hammer head containing the impact face 14. First, this allows the weighted section 48 to be made from a high strength, hardened or tough steel to minimize wear from repeated impact blows, or a more dense material to increase inertia for the hammer when it is swung. Second, spacing apart the weighted section 48 away from the flange 52 (and the handle 18) improves the balance of the hammer, and gives access of the impact face 14 in tight quarters where the handle might otherwise get in the way. Third, the gap between the flange 40 and weighted section 48 may be used as a tool for receiving therein and bending the shaft of a wire or long nail. In an alternative embodiment, the flange and the weighted section are formed integrally with no gap.

FIGS. 6-10 show an alternative embodiment. The hammer construction is essentially the same as in the above embodiment, except that now the triangular notch at the front-facing edge of the handle hoop 26 is replaced by an elongated notch 50. Then the complementary nub 52 coincides with a section of the flange 40. The elongated notch 50 captures the nub/flange section 52 as best seen in FIGS. 1, 7, 8, and 10, which eliminates any rotational movement of the hammer head relative to the handle.

In both exemplary embodiments, the linear forward and backward head motion relative to the handle as well as the rotational movement of the head relative to the handle are eliminated. There is thus a solid mating of these components which is achieved by the wedge locking mechanism engaging the assembly and forcing the assembly against the inside wall of the hoop of the handle.

While the particular preferred embodiments of the invention have been illustrated and described, it will be apparent that various modifications can be made without departing from the spirit and scope of the invention. It is contemplated that elements from one embodiment may be combined or substituted with elements from another embodiment.

What is claimed is:

1. A handheld hammering tool, comprising:

a handle having an elongated shaft with an ovoid cross-section cylindrical hoop at one end and extending transverse to the elongated shaft, wherein the hoop includes a front-facing edge with a notch and a back-facing edge, and wherein the cylindrical hoop and elongated shaft are formed from a single, integral piece of titanium;

a hammer head having an impact face at one end, wherein the hammer head extends rearward to a flange and transitions to an intermediate portion including a sloped surface and terminates in a claw at an opposite end;

wherein the flange includes a rear facing surface that abuts the front-facing edge of the hoop, and the flange further includes a nub captured within the notch in the front-facing edge of the hoop, and wherein the intermediate portion is disposed within the cylindrical hoop;

a wedge with an angular surface engaging the sloped surface of the intermediate portion of the hammer head inside the hoop; and a fastener holding the wedge and the hammer head together.

2. The tool of claim 1, wherein the cylindrical hoop includes a flattened wall section having a length and a thickness, and the intermediate portion includes a stepped-down recessed bed that receives the length and thickness of the flattened wall section therein.

3. The tool of claim 2, wherein the wall section is flattened and located along the top of the hoop, and the flattened wall section is captured within the recessed bed of the intermediate portion.

4. The tool of claim 1, wherein front-facing edge of the hoop includes at least two notches spaced apart from each other, and the flange includes at least two nubs spaced apart from each other that engage the respective notches.

5. The tool of claim 1, wherein the intermediate portion of the hammer head includes a recessed bed, and the hoop includes a wall section with a length and a thickness that is captured within the recessed bed when the angular surface of the wedge pushes the intermediate portion into the wall section.

6. The tool of claim 1, wherein the flange is spaced apart from a weighted section.

7. The tools of claim 1, wherein the nub and notch include a triangular shape.

8. A handheld hammering tool, comprising:

a hammer head including an impact face at one end, wherein the hammer head further includes a flange, and an intermediate portion including a sloped profile leading to a claw at an opposite end;

a handle including an elongated shaft with an ovoid cross-section hoop at an end, wherein the elongated shaft and hoop are formed from an integral piece of titanium, and wherein the hoop is disposed at a right angle relative to the shaft and includes a front-facing edge with a wide notch for capturing a complementary section of the flange therein; and a locking means for securing the hammer head to the handle, wherein the locking means includes a wedge with an angular surface abutting the intermediate portion at the sloped profile, and wherein the locking means is disposed at least partially inside the hoop; and a fastener holding the locking means and the intermediate portion of the hammer head together.

9. The tools of claim 8, wherein the cylindrical hoop includes a flattened wall section, and the sloped intermediate portion includes a stepped-down recessed bed that receives the flattened wall section therein.

10. The tool of claim 8, wherein the handle includes a material selected from the group consisting of steel, titanium, aluminum, fiberglass, wood, plastic, iron, or a combination thereof.

11. The tool of claim 8, wherein the hammer head includes a material selected from the group consisting of steel, titanium, aluminum, iron, or a combination thereof.

12. The tool of claim 8, wherein the angular surface of the wedge engages substantially flush with the sloped profile of the intermediate portion.

13. The tool of claim 8, wherein the flange is spaced apart from a weighted section of the hammer head.

14. A handheld hammering tool, comprising:

a hammer head having a weighted section with an impact face at one end, wherein the hammer head further includes a flange spaced apart from the weighted section and having a nub at its periphery, an intermediate portion including a recessed bed and an angled profile, and a claw at an opposite end;

a handle made from a material including titanium, wherein the handle includes an elongated shaft with an ovoid cross-section cylindrical hoop at an end disposed at a right angle relative to the elongated shaft and formed from a single, integral piece of material, and wherein the hoop includes a front-facing edge with a notch capturing the nub therein, and wherein the hoop further includes a flattened wall section;

a locking means for securing the hammer head to the handle, wherein the locking means includes a wedge with an angular surface abutting the angled profile of the intermediate portion inside the hoop and pushing the recessed bed to capture the flattened wall section of the hoop therein; and a fastener holding the wedge and the sloped intermediate portion together.

15. The tool of claim 14, wherein the front-facing edge of the hoop includes two notches spaced apart and the flange includes two nubs spaced apart, and wherein the two nubs are captured within the two notches.

16. The tool of claim 15, wherein the two notches and two nubs are space 180 degrees apart.

17. The tool of claim 15, wherein the two notches are different sizes.

18. The tool of claim 14, wherein the locking means includes a collar for receiving the fastener therethrough.

* * * * *